Dec. 8, 1953  R. W. FYKE  2,661,675
ONE-WAY DISK HARROW OR PLOW
Filed Feb. 1, 1946  4 Sheets-Sheet 1
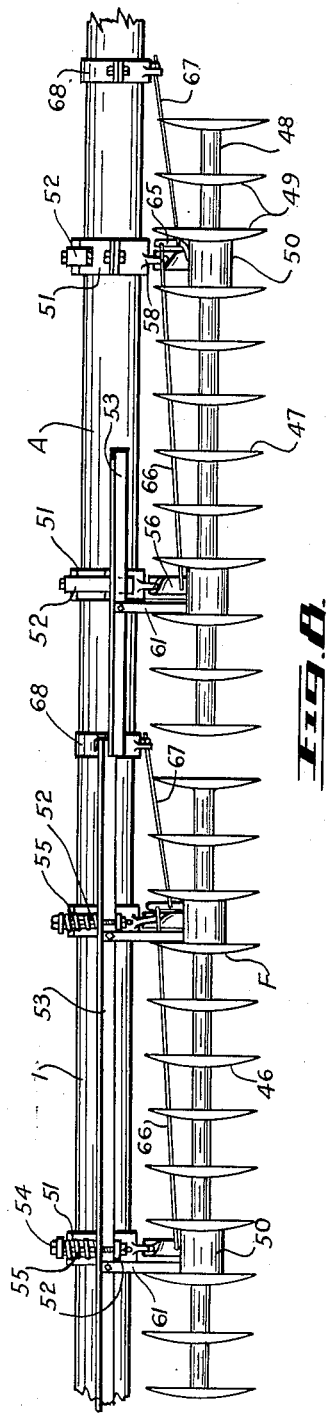
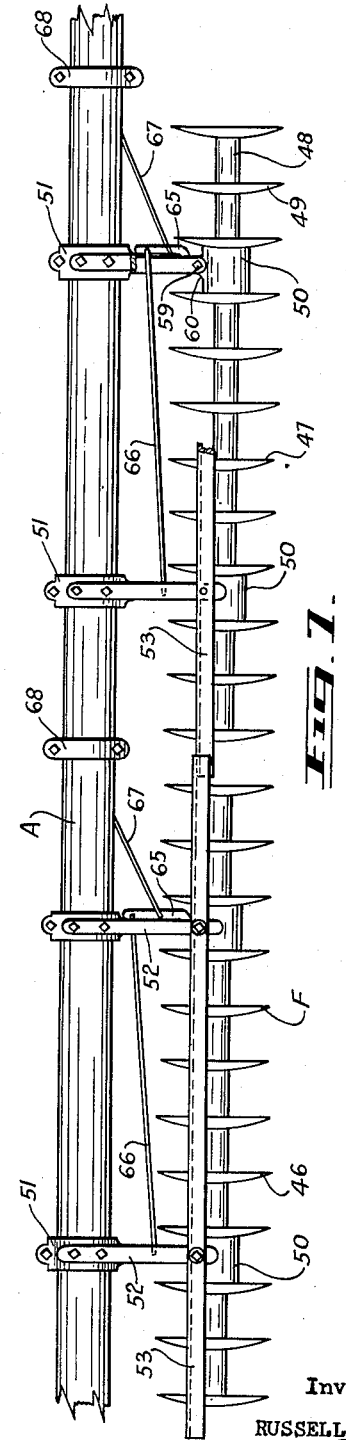
Inventor
RUSSELL W. FYKE
By *W. Irvin Haskett*
Attorney Dec. 8, 1953   R. W. FYKE   2,661,675
ONE-WAY DISK HARROW OR PLOW
Filed Feb. 1, 1946   4 Sheets-Sheet 2
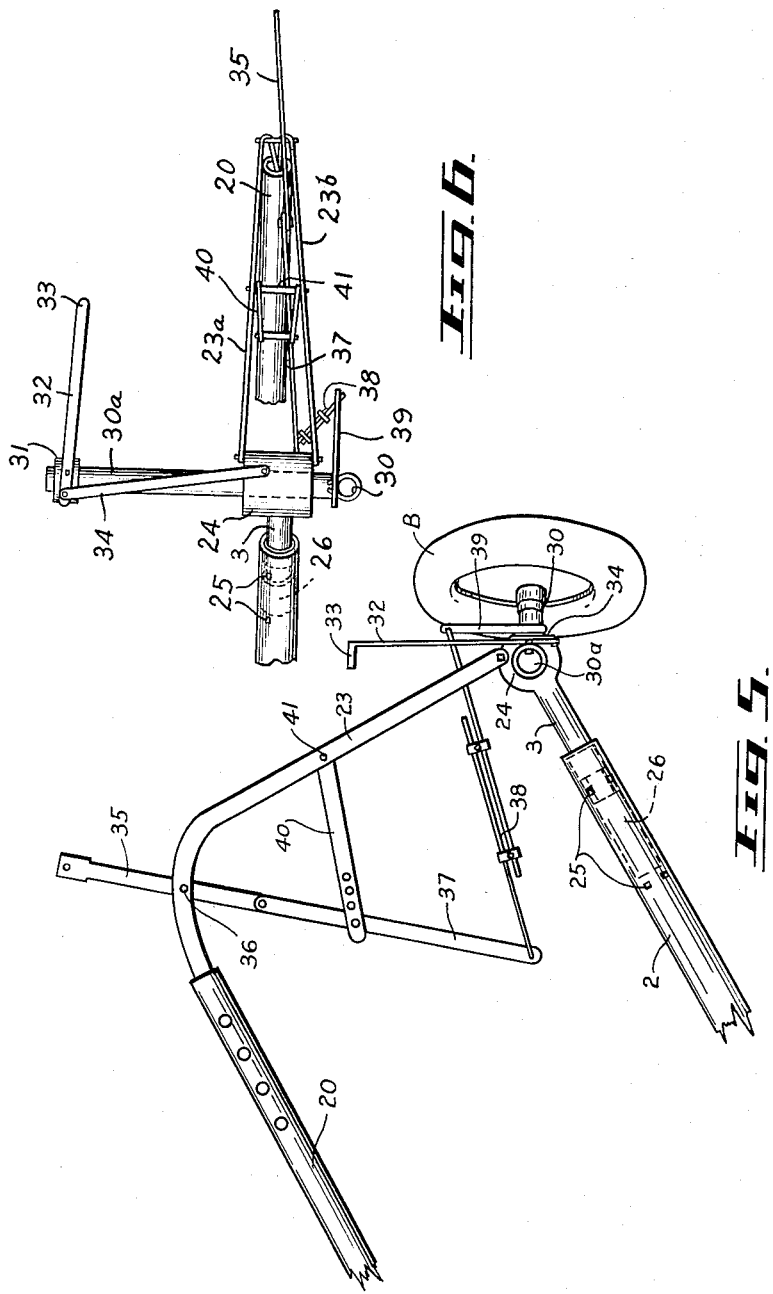
Inventor
RUSSELL W. FYKE
By
Attorney Dec. 8, 1953  R. W. FYKE  2,661,675
ONE-WAY DISK HARROW OR PLOW
Filed Feb. 1, 1946  4 Sheets-Sheet 3
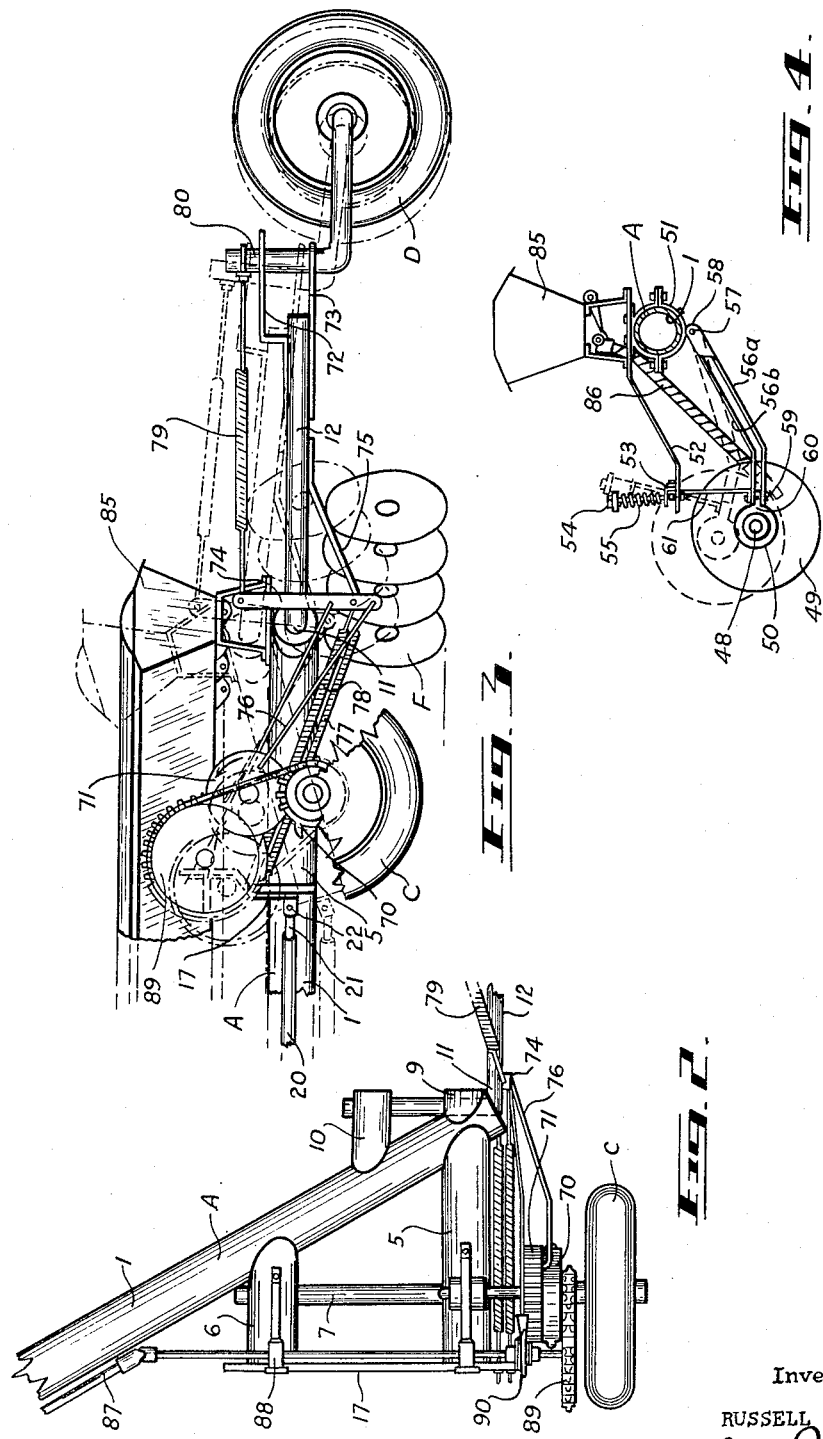
Inventor
RUSSELL W. FYKE
By *W. Jurin Haskett*
Attorney

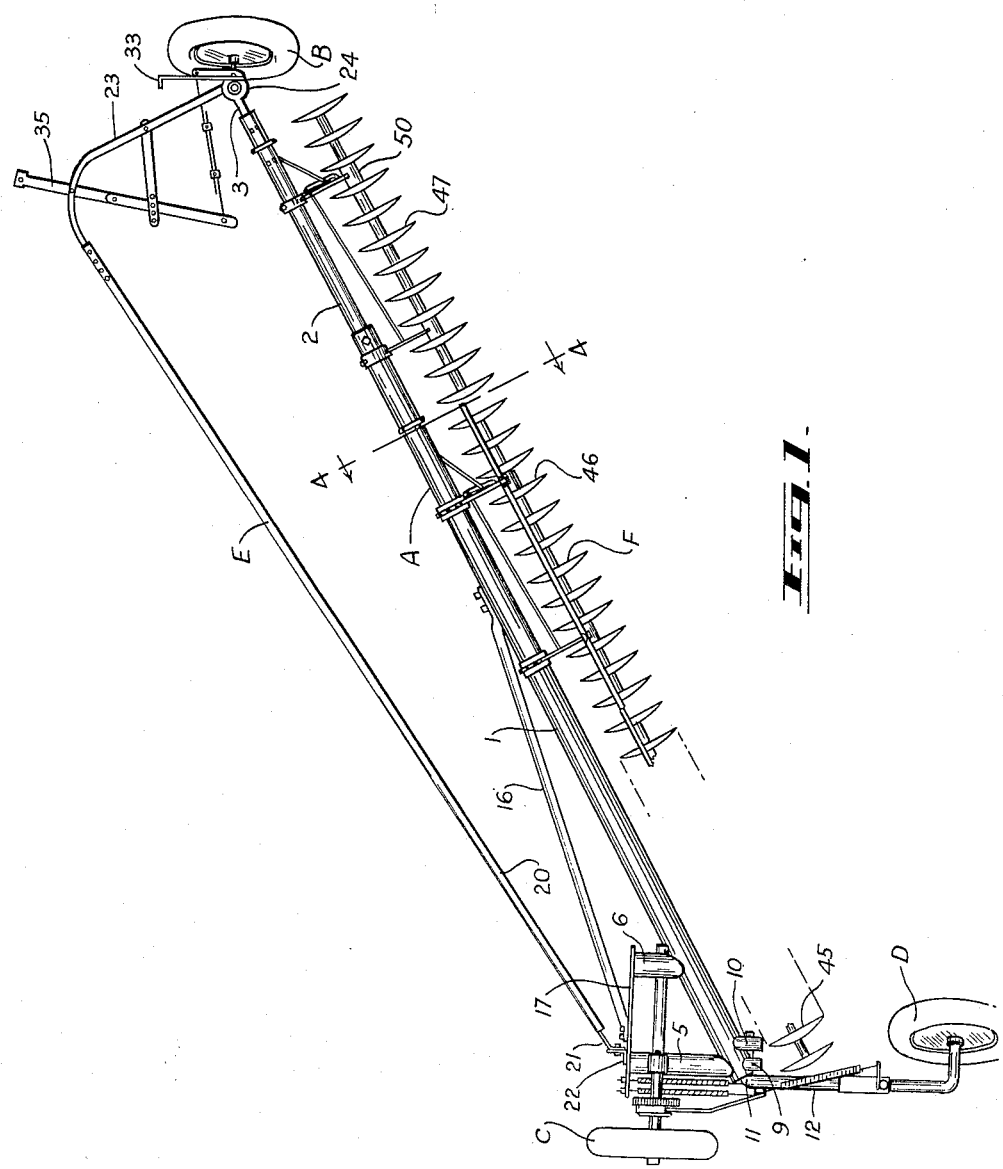

Patented Dec. 8, 1953

2,661,675

UNITED STATES PATENT OFFICE 2,661,675

ONE-WAY DISK HARROW OR PLOW

Russell W. Fyke, Sceptre, Saskatchewan, Canada, assignor to S. J. Safian, Regina, Saskatchewan, Canada Application February 1, 1946, Serial No. 644,899

4 Claims. (Cl. 97—53)

This present invention relates to improvements in a one-way disc-harrow, the nature of the improvements being such that they are applicable in part at least to a plow, cultivator, harrow or seeder combination.

The principal object of the invention is to provide a soil working implement having a simple wheel-carried structure that is rugged, easily adjustable, rotatable with respect to the wheel mounts and possessing operative advantages inherent in its novel design.

Another object of the invention is to provide a gang harrow, for cultivating or ploughing with or without a seeding mechanism, wherein a more uniform treatment of the soil is obtained by having the harrow discs arranged in a plurality of self-adjusting sections that normally operate on a common horizontal plane but are so resiliently mounted that they may individually rise or fall to compensate for obstructions or unevenness in the ground that may be encountered in the wider-than-usual track that this improved implement is designed to work.

Another object of the invention is to provide a sectionalized gang harrow, whose sections are suspended for individual vertical swinging to automatically compensate for undulating surfaces and wherein such sections are interconnected longitudinally to equalize end thrust on their respective bearings.

Another object of the invention is to provide an agricultural implement frame designed to be "lifted" into inoperative position by the buckling of the frame, as by a power-lift type of mechanism wherein the main frame in its buckling lift tilts or teeters slightly to raise the disc gangs by a greater distance than the frame itself is raised while yet the draft assembly retains its normal horizontal position.

Another object of the invention is to provide a tillage or like agricultural implement having a relatively wide frame that may be drawn at an oblique angle to the line of draft, with a hitch arrangement hinged by coupling to the main frame or plow beam, readily adjustable for side drag and especially including a steering mechanism with a leverage multiplying linkage operating on the front furrow wheel.

Another object of the invention is to provide a power drawn tillage implement from the main beam of which, lying at substantially right angles or obliquely to the line of travel, gang sections of harrow discs are supported that are connected in longitudinal line to equalize end thrust and yet are hung for individual resilient vertical hinging, that the wide track of ground traversed without regard to its rolling undulating or uneven contour may be worked to a relatively even depth across its path with the minimum and most uniform draft load enabling a given horsepower of tractive force to operate over a greater width than heretofore.

A still further object of the invention is the provision of a soil working implement such as a combined one-way, disc-harrow and seeder, of the nature and for the purposes described that is characterized by low weight, structural simplicity, ruggedness, durability, operative ease and efficiency, requires little maintenance, is economical in the use of time, fuel and manpower and being capable of manufacture at reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:

Figure 1 is a schematic plan showing the novel frame structure and arrangement;

Figures 2 and 3 are an enlarged plan and side elevation respectively of the land wheel or rear end thereof;

Figure 4 is a similarly enlarged vertical section, as taken on line 4—4 of Figure 1;

Figures 5 and 6 are a plan and side elevation respectively of the draft and steering structure at the forward right or front furrow wheel end; and Figures 7 and 8 are respectively a plan and rear elevation of the harrow disc gang sections.

DESCRIPTION

The trend toward wider soil working machines has encountered several difficulties such as compensating for unevenness in the contour over the wider path, tendency of gangs to dig in, securing uniform treatment, greater draft and lifting loads, offsetting end thrust and its incidental uneven wear. Familiar with these many difficulties I have designed a light weight, drag-reducing easily maneuverable implement, the individual gang sections of which individually follow the rolling contour of the field traversed with exceptional uniformity, working the hollows to almost the same depth as they cut into higher ground, co-operatively aiding the leading disc in a gang section from digging in and equalizing the end thrust on bearings from one gang section to the next.

The frame

This implement comprises essentially a wheel mounted frame A, the main beam 1 of which is of tubular form and extends horizontally for almost the entire width of the machine. The instant main frame piece or beam is here shown as having a second telescopically received pipe-like piece 2 adjustably secured in its forward or right hand end thus allowing the overall length of this main beam to be easily varied. A supporting structure shaft 3 for the front furrow wheel B that will be later referred to in detail, is mounted in the outer end of this main frame extension piece 2.

On the opposite or left hand end, this main frame piece 1 that is disposed at an oblique angle to the line of draft of the implement has a laterally spaced pair of forwardly extending arms 5 and 6, of like tubular form and that terminate in a line at right angles to the machine's draft, in which an axle shaft 7 for the ground wheel C is journalled. Similarly a lesser spaced pair of somewhat shorter tubular arms 9 and 10 extend rearwardly, terminating parallel with the free outer ends of the forwardly extending arms, i. e., at right angles to the machine's line of draft, the outermost arm 9 being substantially aligned with the arm 5 and both occurring practically on the very end of the frame beam. The angularly bent end 11 of a rearwardly reaching bar 12 that supports the rear furrow wheel D is pivotally journalled in these rear arms 9 and 10 passing in horizontally through the open end of the main frame pipe 1.

This strong yet light weight frame is reinforced by a brace 16 between the forward side of the main cross beam 1, 2 and a plate 17 across the free ends of the forward arms 5, 6.

Draft hitch and steering assembly

The general outline of the draft hitch E is in the form of a substantial right angle, and connected with the implement frame A in a manner to allow of relative vertical hinging. A long straight arm 20 has a hinge bracket 21 on its end that is pivotally connected to a horizontal angle bracket 22 on the front of the frame end forward plate 17. This arm 20 is almost as long as the beam of the frame A though diverging forwardly therefrom and is completed by an angle extension 23, telescopically received in its free end and longitudinally adjustable therein, that bends back to fasten to the outer end, furrow-wheel supporting structure shaft 3 hereinbefore referred to. This angular and rearwardly continuing extension 23, that completes the draft hitch frame structure, is composed of two identical vertically spaced halves 23a and 23b that unite to enter the long tubular arm 20 and spread toward their other ends to attach to opposite upper and lower sides respectively of the vertically bored sleeve 24 in which the outer end of the wheel supporting structure shaft 3 terminates. It may here be pointed out that this shaft 3 that mounts the front furrow wheel B extends into the end of the telescoped main frame pipe 2 where it is held against dislodgment but rotatably free by spaced fastening bolts 25 that confine opposite ends of a collar 26 secured on its inserted inner end. It will thus be seen that the pivotal connection with the hinge bracket 22 on the far end of the arm 20 and this freely rotatable shaft 3 in the forward end of the telescoped frame pipe 2 affords a free vertical hinging between the implement frame A and the draft hitch frame E.

The front furrow wheel B has a relatively horizontal or slightly tilted axle shaft 30 on which it turns freely that bends at a substantially right angle and rises as a post 30a through the sleeve 24 on the end of the shaft 3. A collar ring 31 held on the upper end of this vertical post 30a has a lever 32 pivoted thereto with a hand grip 33 on its long free end and a link 34 connecting its shorter end to the sleeve 24 so that on the downward swinging of the lever the structure-supporting shaft 3 extending horizontally into the main frame A is raised.

The steering of this front furrow wheel B is by a linkage designed to give it a ratio of approximately 2:1. The tongue or draw bar 35 to which the hauling tractor attaches is pivoted as at 36 between the halves of the vertically split hitch frame extension 23 just about its bend. The rear of this tongue then pivotally connects to the front of an extension 37 whose rear end connects by a 2-piece, longitudinally adjustable link 38 with a knuckle 39 on the wheel axle 30; the tongue extension 37 being mid-way pivoted in any of a number of selective positions on the inner end of a composite arm reach 40 whose spreading outer end is hinged as at 41 in the rearwardly extending part of the vertically split extension 23.

Disc gang

The provision of the disc gang F in a plurality of individual sections longitudinally aligned parallel with the main frame A, the resilient suspension of the sections to allow each to swing vertically alone and the novel means to absorb and/or equalize end thrust on the bearings of successive sections is an especially important feature of the present invention.

In the assembly plan shown in Figure 1 the gang F is seen to comprise three sections 45, 46 and 47. This is simply for purposes of illustration and any preferred number of sections with as many discs as desired may be used or multiples of this sectionalized gang may be employed in echelon, tandem, offset or staggered arrangement.

Each section comprises a rotatable shaft 48 on which a plurality of spaced discs 49 are carried. A pair of evenly spaced bearings 50 support the shaft in the usual way. If particlular attention is now paid to Figures 4, 7 and 8, the individual hinging section suspending means will be seen in side elevation, plan and rear elevation respectively. On the main tubular beam 1 of the frame A, and longitudinally adjustable to enable varying the number and position of the sections of discs used, two-piece collar-like brackets 51 each formed of vertically separable halves are securely fixed. There are two for each gang section and they are spaced on the beam 1 in registry with the disc shaft bearings 50. To the top of each collar-like bracket there is connected a rearwardly extending, downwardly offset suspension bar 52. An angle iron 53, a little longer than the disc section so that they may overlap those of adjacent sections overlies each pair of suspension bars 52 and is resiliently connected by an elongated nut and bolt assembly 54, the bolt of which passes freely through the bar and angle and carries a coil spring 55 on the upper reach of its stem compressed between its head and the angle iron 53.

The gang sections are hauled by draft arms 56 extending downwardly and rearwardly from the rotatably adjustable collar-like brackets 51 on the frame A to the disc shaft bearings 50 being formed of two horizontally spaced straps 56a and 56b where they connect by a horizontal pivot pin 57 to a lug 58 on the underside of the bracket and then twisting into vertically spaced relation to connect by a vertical pin 59 to a lug 60 on the forward side of the bearing 50. Rising also from each bearing 50 is a load carrying post 61 whose upper end fastens to and underlies the yieldable angle iron 53. A constant and uniform spring pressure is thus yieldingly exerted downwardly on the disc sections against which they may rise by vertically hinging whenever an obstruction or elevation in the contour of the land is encountered.

To equalize end thrust wear on the pair of bearings 50 for each section, an equalizer bar 65 is pivoted by a downturned stem in the draft arms 56 of the leading bearing. The bar inclines forward parallel with but offset from the draft arm, has a rod 66 reaching to the draft arms of the other bearing from its free end and an adjustable take-up rod 67 reaching forward from about its middle to an anchoring clamp 68 on the main frame beam 1 on which it is slidably adjustable.

Besides the overlapping of the sections' angle irons 53 so that each overlies the adjacent end of the preceding one to obviate any tendency of the leading section or disc to dig in, an uplift spring suspension may be provided for the forward end of the leading section.

*Lifting*

Because of the unique frame structure the common type of land wheel operated power lift is here used with special advantage. The land wheel C on the axle shaft 7 journalled in the forwardly directed frame arms 5 and 6 carries the usual power lift drum 70 with the usual driven gear 71 engaging.

The rear furrow wheel bar 12 with its angularly turned end 11, journalled in the end of the main frame tube 1 and its rearwardly extended arms 9 and 10, by a vertically spaced pair of brackets 72 and 73 pivotally mounts the trailing rear furrow wheel D. This assembly is held against collapse, at the pivotal junction of the journalled end 11 of the bar 12 in the end of the main frame and in the normal operative position shown in Figure 3, by a vertical cross bar 74, applied to the bar 12 a short distance back of its pivot end and further reinforced from its lower end to the underside of the said bar 12 by a supporting brace 75, and a tension rod 76 reaching from the braced lower end of the cross bar 74 to the power lift drive gear 71. When the power lift is tripped in the usual way, the gear 71 rotates about one-half turn so that the connection tension rod 76 draws forwardly on the lower end of the vertical cross rod 74 causing the frame to fold on the pivot 11 that consequently is lifted, easily raising the whole frame and simultaneously tipping it forwards; the far end of the main frame A, it will be recalled, is free to turn on the front furrow wheel shaft 3 and may be further raised on the axle post 30a by the lever 32. As this whole machine folds, raising and tipping the frame A forwards, the suspension bars 52 reaching out to the back and underlying the angle irons 53, the draft arms 56 and all the disc gang F swing upwardly, raising proportionately much more than the frame A itself yet accomplished easily and with the minimum of power.

In this lifting action, the draw on the rod 76 is eased by a pair of contracting coil springs 77 and 78 between the lower end of the vertical cross bar 74 and the front frame plate 17, they also cushion the return.

To constantly return the trailing rear furrow wheel D to position, a tension spring 79 is stretched to its axle post 80 from the top of the vertical cross bar 74.

*Seeding*

Though useable alone for any such operation as plowing, harrowing, cultivating, etc., the instant design of implement is intended for simultaneous seeding and to that end mounts a usual type seed hopper 85 atop the main frame A. Ordinary grain drill pipes 86 run down toward the discs and a hopper feed mechanism drive 87 will be seen in Figures 2 and 3 journalled at the take-off end in bearings 88 on the frame arms 5 and 6. This drive shaft 87 is operated by a sprocket chain 89 from the land wheel shaft 7 and has an automatic ratchet shut-off 90 actuated by the power lift gear 71. The seeding mechanism, per se, is not however essential but only incidental to this invention and so the mechanism such as the hopper, drill pipes, driving means and cut-off are only illustrated and described to the extent that their operation may be related and their position oriented to the rest of the machine. It will be apparent too, that the weight of the loaded grain hoppers 85 when thrown forwards in the teetering lifting operation will counterbalance part of the weight of the disk gang and considerably lighten the load on the power lift.

*Modus operandi*

In use this soil treating implement, with or without the seeding attachment may be used to great advantage in securing a uniform cultivation of the soil, the machine is very maneuverable, responding easily to change of direction and turning in a short radius, the draft is light with the vertically yielding sectionalized gang and the equalized end thrust take-up and the overlapped section angles to obviate any dig-in tendency at the forward ends of the sections and withal the gang may be lifted high with little effort.

From the foregoing description taken in connection with the accompanying drawings, it will be manifest that a combination one-way disc-harrow and seeder is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restricted sense.

Having thus described the invention, what is claimed as new is:

1. A tillage implement of the combined one-way disc-harrow and seeder type comprising a wheel-carried, and partially rotatable beam disposed transversely of the line of draft, a plurality of individual disc sections, a pair of longitudinally adjustable brackets for each section secured on and rotatable with said beam, supporting arms rigid with and extended rearwardly from the top of said brackets, an angle iron for each section overlying and movably connected with each pair of supporting arms, coil springs held by said arms and bearing downwardly on said angle irons, upstanding posts mounted on said disc sections and secured at their upper ends to said angle irons and draw bars for said sections running forwardly therefrom and hingedly connected at their front ends to the underside of said rotatable, beam-carried brackets.

2. A tillage implement of the combined one-way disc-harrow and seeder type comprising in combination a wheel-carried, longitudinally adjustable, liftable and rotatable beam disposed transversely of the line of draft, a plurality of disc sections each having an axle shaft with a pair of bearings and discs spaced therealong, a pair of longitudinally adjustable, two part brackets secured on and rotatable with said liftable and rotatable beam for each disc section, a supporting arm rigid with and extended rearwardly from the top of each bracket, an angle iron overlying each pair of said arms, connecting posts between said bearings and said angle irons, compressed coil springs held by said bars and bearing downwardly on said angle irons, a draw bar from the underside of each bracket to one of the said bearings, a laterally offset equalizer bar at the forward bearing of each section, a rod from the forward end thereof to the other bearing, a second rod from the centre of the equalizer reaching forwards in the other direction and an adjustable clamp on the beam for each of said second rods.

3. A tillage implement of the combined one-way disc-harrow and seeder type comprising a wheel-carried and partially rotatable beam disposed transversely of the line of draft, a plurality of individual disc sections each comprising an axle shaft with spaced discs and a pair of bearings thereon, a pair of longitudinally adjustable brackets for each section secured on and rotatable with said beam, supporting arms rigid with and extended rearwardly from the top of said brackets, an angle iron for each section overlying each pair of supporting arms, said angle irons successively overlapping the adjacent end of the immediately leading one, coil springs held by said arms and bearing downwardly on said angle irons, upstanding posts surmounting said disc section bearings and connected at their upper ends to said angle irons, and drawbars from said sections hingedly connected to the underside of said rotatable, beam-carried brackets.

4. For an agricultural implement having a wheel-carried and rotatable frame disposed at a transverse angle to the line of draft, a disc gang comprising a plurality of multiple disc sections individually hinged to said frame and a common lifting means for said gang extending over said gang from and rigidly attached to said rotatable frame and means equalizing the vertical movement of adjoining sections.

RUSSELL W. FYKE.

References Cited in the file of this patent

UNITED STATES PATENTS

| Number | Name | Date |
|---|---|---|
| 848,912 | Leuty | Apr. 2, 1907 |
| 967,093 | Waterman | Aug. 9, 1910 |
| 990,641 | Donald | Apr. 25, 1911 |
| 1,251,824 | Roos | Jan. 1, 1918 |
| 1,707,650 | Youngren | Apr. 2, 1929 |
| 1,944,674 | Silver | Jan. 23, 1934 |
| 2,042,133 | Underwood | May 26, 1936 |
| 2,070,425 | Engel | Feb. 9, 1937 |
| 2,377,410 | Field | June 5, 1945 |
| 2,426,354 | Johnston | Aug. 26, 1947 |

FOREIGN PATENTS

| Number | Country | Date |
|---|---|---|
| 573,796 | France | Mar. 17, 1924 |